United States Patent
Müller

[11] 3,873,898
[45] Mar. 25, 1975

[54] PHYSICAL CONDITION RESPONSIVE TRANSDUCER SYSTEM, PARTICULARLY MAGNETIC FIELD TRANSDUCER SYSTEM ESPECIALLY FOR USE IN OR COMBINATION WITH BRUSHLESS D-C MOTORS

[75] Inventor: Rolf Müller, St. Georgen, Germany

[73] Assignee: Papst-Motoren KG, St. Georgen, Germany

[22] Filed: Dec. 21, 1973

[21] Appl. No.: 427,404

[30] Foreign Application Priority Data
Dec. 23, 1972 Germany............................ 2263242

[52] U.S. Cl................. 318/138, 318/254, 318/345, 318/331
[51] Int. Cl............................................. H02k 29/02
[58] Field of Search.................. 318/254, 138, 439; 307/270, 254

[56] References Cited
UNITED STATES PATENTS

| | | | |
|---|---|---|---|
| 3,525,883 | 8/1970 | Iordanidis............................ | 307/254 |
| 3,549,967 | 12/1970 | Uemura et al...................... | 318/254 |
| 3,559,014 | 1/1971 | Rakes................................... | 318/254 |
| 3,564,281 | 2/1971 | Tokunaga........................... | 307/254 |
| 3,643,142 | 2/1972 | Rakes................................... | 318/254 |
| 3,688,172 | 8/1972 | Sieber et al......................... | 318/138 |
| 3,716,769 | 2/1973 | Brunner.............................. | 318/138 |
| 3,757,185 | 9/1973 | Brunner et al..................... | 318/138 |

FOREIGN PATENTS OR APPLICATIONS
2,000,498 1/1972 Germany

*Primary Examiner*—Robert K. Schaefer
*Assistant Examiner*—John J. Feldhaus
*Attorney, Agent, or Firm*—Flynn & Frishauf

[57] ABSTRACT

A pair of serially connected transducer elements, typically magnetically responsive diodes, are connected across the source of voltage supply; the resistance of the diodes changes, depending on their being subjected to a magnetic field, for example by a permanent magnet rotor. The junction between the serially connected diodes is connected, in turn, to a logic circuit which has a supply terminal input to which a controlled potential can be applied. Depending upon the voltage level at the junction between the transducer elements (magnetic diodes) one or the other output of the logic circuit is connected to the supply terminal so that, upon connection of a controlled voltage (for example representative of a speed control signal) one or the other output terminal is accordingly energized to, in turn, accordingly energize a transistor connected in series with the logic circuit to control current flow through armature windings of the motor.

24 Claims, 4 Drawing Figures

PHYSICAL CONDITION RESPONSIVE TRANSDUCER SYSTEM, PARTICULARLY MAGNETIC FIELD TRANSDUCER SYSTEM ESPECIALLY FOR USE IN OR COMBINATION WITH BRUSHLESS D-C MOTORS

CROSS REFERENCE TO RELATED APPLICATIONS

U.S. Ser. No. 363,290 and 363,291, filed May 23, 1973; U.S. Ser. No. 408,781, filed Oct. 23, 1973, all assigned to the assignee of the present invention.

The present invention relates to a condition dependent transducer system, and more particularly to a magnetic field dependent transducer system which can be used to control current flow to the armature windings of a brushless d-c motor having a permanent magnet rotor.

Magnetic control elements and control systems can be used in many applications where contactless electric sensing signals are to be generated, controlled by the direction of a magnetic field. Such magnetic control elements can be used to connect a first relay if a Northpole approaches the transducer, and connect a second relay if a Southpole approaches the transducer. Another application is control of commutation of a brushless, or commutator-less d-c motor.

It has previously been proposed to utilize two pairs of magnetic diodes to control commutation of a brushless d-c motor (see DT-AS 2,000,498). The magnet diode pairs control current flow in four respective associated motor windings. Complementary, bipolar transistors are used in the circuit. One motor winding is connected to an npn transistor, the other to a pnp transistor. This requires connection of one motor winding to the positive terminal of a d-c source and the other motor winding to the negative terminal, and generation of an auxiliary voltage by means of a voltage divider. Undesired additional losses arise in this circuit, decreasing the overall efficiency of the motor and its associated commutating control system.

It is an object of the present invention to provide an improved magnetic field dependent control system, and more particularly such a system useful in combination, or in conjunction with brushless d-c motors.

SUBJECT MATTER OF THE PRESENT INVENTION

Briefly, two serially connected transducer elements, such as, for example, magnetic diodes, and responsive to change their electrical impedance upon being subject to a field, such as a magnetic field, are connected across a pair of supply terminals. The voltage at the junction of these elements changes, in dependence on the direction of the field applied to the elements, and this changing voltage is applied to one input of a logic circuit. The logic circuit has two relatively opposite, essentially symmetrical complementary outputs, and a further supply terminal input. The connection from the junction of the serially connected transducer elements functions as a steering input to the logic circuit to connect the supply terminal to either one, or the other of the outputs, so that the output derived from the logic circuit will be representative of the input applied to the supply terminal, the specific output terminal being controlled by the voltage appearing at the junction of the two serially connected elements.

In accordance with a preferred embodiment, the transducer system formed of the logic circuit and the serially connected elements include a non-symmetrical logic circuit which has a controlled semiconductor element, such as a transistor, connected between the supply terminal and one of the outputs. The conduction of the semiconductor element is controlled by the voltage appearing at the junction between the two transducer elements. The outputs from the logic circuit are connected to respective controlled semiconductors, such as further transistors, the signal applied to the supply terminal, for example a control voltage, being applied to one of the output terminals over the controlled semiconductor elements, or to the other output terminal, without interposition of the controlled semiconductor element. In a particularly simple form, the logic circuit uses a second semiconductor element which is not controlled, however, such as a diode, which is so matched to the controlled semiconductor element, for example a transistor; that the forward voltages of the diode, or the transistor (when in conductive condition) are different; the overall voltage drop through the semiconductor element and the control path of the thereby controlled semiconductor is less than the forward voltage drop of the uncontrolled element, for example the diode, and the control path of the associated semiconductor element. The forward voltage drop, in this context, may also be taken as the saturation voltage, that is, the forward voltage drop upon conduction in said saturation. Such an arrangement can utilize the characteristics of different semiconductor elements to provide an elegant solution with minimum number of components to control transistors, or similar conponents, having their emitter-collector path (or equivalent) connected in series between a load, and the supply terminal, and controlled by the aforementioned circuit. This load may, for example, be respective armature windings of a brushless d-c motor having a permanent magnet rotor, the field from the permanent magnet rotor controlling the relative conduction of the magnetically responsive transducer elements. The control voltage applied to the supply terminal may, for example, be an outside control signal to provide torque, or speed control; the signal may, additionally, be derived from a closed loop to control the speed of the motor to maintain a predetermined value.

The invention will be described by way of example with reference to the accompanying drawings, wherein.

Figure 1:
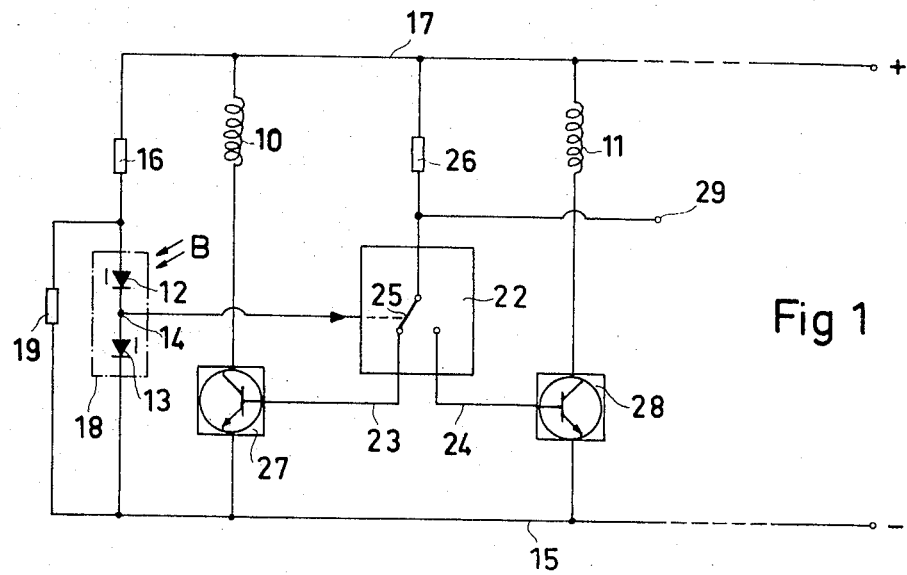
FIG. 1 is a highly schematic abbreviated block diagram of the transducer system in accordance with the present invention.

A pair of loads 10, 11 (FIG. 1) which may, for example, be armature windings, windings of relays, or other loads, are controlled through the emitter-collector paths of two controlled semiconductor elements, respectively, shown as transistors 27, 28. The transistors and the loads are connected between positive and negative buses 17, 15, having a supply voltage, for example of 24 V applied thereacross.

Current through the loads 10, 11 should flow exclusively in either the one load 10, or the other load 11. For complementary, relatively opposite and essentially symmetrical control of the current flow, a pair of magnetic field dependent transducer elements 12, 13 are provided. The elements 12, 13 may, for example, be magnetic field dependent diodes. The magnetic field diodes 12, 13 are serially connected, and have a common junction 14. Diode 13 is, further, connected to negative bus 15 and diode 12 is connected over a resistor 16 to positive bus 17. A resistor 19 is connected in parallel to the series circuit of the diodes 12, 13, with their intermediate junction 14, which forms a unit 18. Resistors 16, 19 supply the requisite voltage for the diode unit 18 and further serve as temperature compensation elements.

Figure 3:
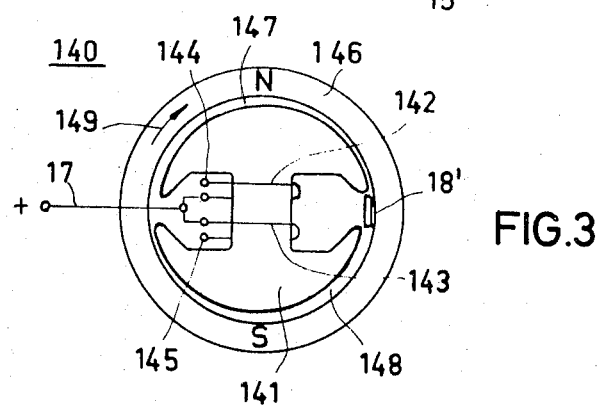
FIG. 3 is a schematic cross-sectional view through a motor controlled by the circuit of FIG. 2.

The magnetic diode pair 18 is associated with a device, such as a motor, in which it is influenced by a magnetic field B of a permanent magnet, not shown in FIG. 1. If the device is a motor, the permanent magnet may be the rotor of the motor (as will be discussed in detail in connection with FIG. 3) so that the direction of the field B changes with rotation of the rotor. This, then, results in a change of the voltage of junction 14. If the field has one direction, it becomes more positive; if the field has the opposite direction, it becomes more negative.

Junction 14 is connected to a logic circuit 22 to provide a control input therefor at which the change in voltage at junction 14 is reflected. The logic circuit 22 will be described in detail in connection with FIG. 2 and, in actual practice, would normally include electronic switching elements. The logic circuit 22 has two complementary, mutually exclusive, relatively opposite and essentially symmetrical outputs 23, 24. When one of the outputs, for example 23, has a "high" signal, the other will have a "low" signal, and vice versa. The outputs 23, 24 preferably are symmetrical with respect to each other. This arrangement is, schematically, shown by the change-over switch 25, to which current is applied over a resistor 26, connected to positive bus 17.

Output 23 is connected to the control terminal of controlled semiconductor element 27, connected in series with the load 10, between buses 15, 17; similarly, output 24 is connected to the control terminal of controlled semiconductor element 28 connected in series with the load 11 between positive and negative buses 17, 15.

OPERATION

Let it be assumed that a permanent magnet provides a field B to the transducer assembly 18 in such a manner that the voltage of junction 14 becomes strongly positive, which positive voltage controls the switch 25 in logic circuit 22 to connect positive bus 17 over resistor 26 to the semiconductor 27. Semiconductor 27 becomes conductive and current can flow through load 10. The semiconductor element 28 is blocked.

Upon change of the direction of the field applied to the diode pair 18, the voltage at terminal 14 changes, logic circuit 22 changes over, and the positive bus 17 will be connected over resistor 26 to the output 24, thus causing semiconductor element 27 to block, and semiconductor element 28 to be conductive, thereby energizing load 11.

A separate terminal 29 can be provided in the circuit of FIG. 1, connected to the logic circuit 22, to which a separate control signal, such as an analog command signal is applied, entirely independent of the voltage at junction 14 and independent of the signal derived from the magnetic field responsive diodes 12, 13. Thus, it is possible to command the conduction of the controlled semiconductor elements 27, 28 to be more, or less conductive, or conductive during a longer, or shorter time period, respectively, or both, depending on the characteristics of the control signal applied to terminal 29.

Figure 2:
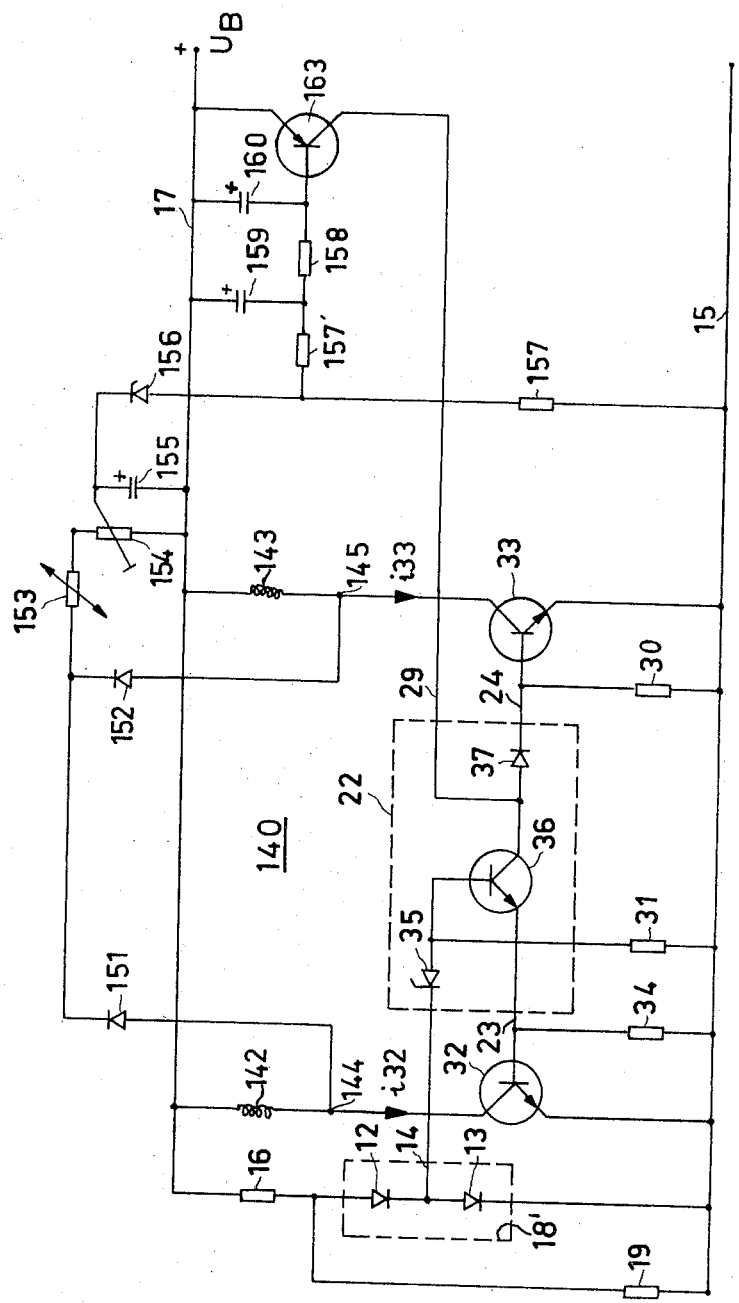
FIG. 2 is a schematic diagram of the transducer system in combination with a speed controlled brushless d-c motor.

FIG. 2 illustrates a detailed circuit, in which a control signal from terminal 29 commands the conduction of the transistors 27, 28. Similar, and similarly acting parts as in FIG. 1 have been given the same reference numerals and will not be explained again. In the example of FIG. 2, the load is a brushless d-c motor 140, referred to, below, in connection with FIG. 3. The motor has two achematically shown armature windings 142, 143, and a permanent magnet rotor. Windings 142, 143 have one terminal connected to positive bus 17, and the other connected to the collector of an npn transistor 32, 33, respectively; the emitters of the two transistors are connected to negative bus 15; the base of transistor 33 is connected to terminal 24 of the logic circuit 22, the base of transistor 32 is connected to the terminal 23 of the logic circuit 22. A base resistor 34 connects the base of transistor 32 to the negative bus 15, in order to ensure that the transistor 32 is reliably blocked if the output 23 is low. Similarly, a base resistor 30 connects the base of transistor 33 to negative bus 15.

The logic circuit 22 includes a semiconductor element gaving voltage breakdown characteristics, such as Zener diode 35. The cathode of Zener diode 35 is connected to junction 14 of the magnetic diode pair 18. The anode of Zener diode 35 is connected to the base of an npn transistor 36. A resistor 31 connects the anode of Zener diode 35 to negative bus 15. The emitter of the transistor 36 is connected to the output 23. Its collector is connected to the supply terminal 29 for a control signal. A diode 37 has its anode connected to the supply terminal 29, and its cathode to the output 24 of the logic circuit.

OPERATION

Basically, the operation is similar to that explained in connection with FIG. 1. Let it be assumed that junction 14 has a relatively low voltage, for example +3V with respect to 0 voltage of the negative line 15. Let it further be assumed that the Zener diode 35 blocks at such a voltage, so that the transistor 36 does not receive base current, and likewise blocks, so that transistor 32 will not receive base current and is held securely blocked by resistor 34. Current from terminal 29 can flow only over diode 37 to transistor 33, causing transistor 33 to become conductive, so that winding 143 is supplied with current. Current flow in winding 143 is controllable by the amplitude, and time duration of the current in line 29. This is one of the distinct advantages of the circuit in accordance with the present invention. In contrast to an arrangement in which a Hall generator is used, the control current of which is a multiple of the Hall current delivered thereby, the current applied to terminal 29 is effective as a base current, so that the current through winding 143, in the emitter-collector path of transistor 33 can be continuously controlled by an analog signal, with amplification.

Upon change of the field B, junction 14 will receive a highly positive voltage, for example +5V with respect to bus 15. This voltage is greater than the sum of:

a. breakdown voltage of Zener diode 35;
b. base-emitter junction voltage of transistor 36; and
c. base-emitter voltage of transistor 32.

Transistor 36 will now receive base current. A control current from the supply terminal 29 can now flow to the base of the transistor 32 to cause transistor 32 to become conductive, so that current can flow through winding 142. This current, likewise, is controllable by the amplitude and time of the current applied to the supply terminal 29, that is, by an analog signal.

When transistors 36 and 32 are conductive, the base-emitter path of transistor 32 will have a junction voltage of about 0.6 V applied thereto. The collector-emitter path, however, of the transistor 36 will have a saturation voltage of only about 0.3 V. The collector of the transistor 36, therefore, will have a voltage of +0.9V with respect ot the negative bus 15, a voltage which is essentially independent of the control current supplied to the supply terminal 29.

The series circuit of the diode 37 and the base-emitter path of transistor 33, in order to render the transistor 33 conductive, require a voltage of 1.2V. The forward voltage drop for diode 37 will be about 0.6V; the junction voltage of the base-emitter junction of the transistor will also be 0.6V. These two junction voltages are more than the collector-emitter forward voltage drop across transistor 36 and the junction voltage (base-emitter) of transistor 32. Diode 37 will, therefore, remain in blocked condition, and transistor 33 will be blocked by clamping of the voltage of bus 15, over resistor 30 to the base thereof, so that winding 143 will be de-energized.

The base current of transistor 32 is controlled from the supply terminal 29 and is effectively controllable without losses.

The logic circuit 22, which is non-symmetrical, is simple and permits, in a simple manner, direct connection of control voltages to the transistors 32, 33. It can be constructed as an integrated circuit, including also the transistors 32, 33 in the integrated circuit, thus resulting in an extremely simple arrangement. The steering signal, derived as the output signal from the magnetic diode assembly 18, only steers the switching connection for the command voltage applied to the supply terminal 29. This, therefore, permits use of a control circuit having only low output power.

The principle of control is independent from the signal applied to terminal 29. It can be used to apply any kind of command, or control signal on terminal 29, and, when used in connection with a motor, can be applied to control the motor speed, or motor torque, for example. For speed control, any signal proportional to, or representative of motor speed can be used. In the example to be described, and as shown in FIG. 2, the speed command signal is a voltage, induced in the motor windings, and sensed by coupling diodes 151, 152.

The motor will be described only briefly; for a detailed discussion reference is made to the cross-referenced applications Ser. Nos. 363,290 and 363,291, by the inventor hereof, and assigned to the assignee of the present application. Reference may also be had to cross-referenced application U.S. Ser. No. 408,781, Oct. 23, 1973, assigned to the assignee of the present invention.

Motor 140 (FIG. 3) is an external rotor motor which has a salient pole stator 141, with two windings, or coils 142, 143, having one terminal, respectively, connected to positive bus 17, and the other respective terminals 144, 145 connected to the collector of transistors 32, 33, respectively. The stator 141 is constructed with salient poles of substantial overlap, so that the edges of the poles almost meet each other. These poles interact with a two-pole permanent magnet rotor 146, and are separated from rotor 146 by air gaps 147, 148. The air gaps change in radial dimension, in the direction of rotation, as indicated by arrow 149, by decreasing in the direction of rotation. The stator poles, therefore, when developed, are roughly saw-tooth shape at the surface facing the air gap. As a result, a reluctance torque which is non-symmetrical will result in operation of the motor. The positive portions of this reluctance torque, that is, the driving portion thereof becomes effective in the gaps during which there is no electromagnetic driving torque, as explained in detail in the aforementioned cross-referenced applications.

A magnetic diode pair assembly 18 is located on stator 141, magnetically offset with respect to the axis of the windings by 90°-electrical. Such motors are self-starting and provide an essentially constant torque, due to their constructional characteristics. It is important that the decreasing air gap extends over a relatively large portion of the arc over which the pole itself extends, and that the shape of the air gap is matched to the distribution of magnetization of the rotor 146. In the example shown, the rotor 146 is trapeze-shaped magnetized (see the cross-referenced applications).

As illustrated in FIG. 2, the anodes of diodes 151, 152 are coupled to junctions 144, 145, respectively. The cathodes of the diodes 151, 152 are connected, in common, over an NTC resistor 153, and a potentiometer 154 to the positive bus 17. A smoothing capacitor 155 is connected between the positive bus 17 and the tap point, or slider of potentiometer 154, which further is connected to the cathode of a Zener diode 156, the anode of which is connected over resistor 157 with negative bus 15. The Zener voltage of Zener diode 156 is so selected that, when the motor has approximately nominal speed, the Zener voltage is about equal to the d-c component of the wavy, or undulating voltage appearing at the tap or slider point of the potentiometer 145. Diode 156, therefore, effectively shifts the level of this d-c voltage in negative direction by the value of the Zener voltage.

The phase of the undulations, or superimposed a-c component 93 of this d-c voltage is undesirable for control of current flow through the motor. Voltage 93 is seen in graph (a) of FIG. 4. It is phase-shifted by about 180°, to obtain an undulating voltage 94 — FIG. 4, graph (b). The anode of Zener diode 156 is, therefore, connected to further circuit components including resistor 157', a capacitor 159 between positive bus 17 and the other terminal of resistor 157, a further resistor 158 and a further capacitor 160, connected between the positive bus 17 and the other terminal of resistor 158. The phase shift network, overall, then includes resistors 153, 154, capacitor 155, resistors 157', 158 and capacitors 159, 160. The resistors 157', 158 are connected in series between the anode of Zener diode 156 and the base of a pnp transistor 163, so that the undulating voltage 94 (FIG. 4 graph b) is applied to the base of transistor 163. When the command speed is reached, the maxima of the wavy signal 94 cause blocking of the transistor 163. At the minima of the wavy system, however, transistor 163 will become conductive, as seen between time intervals $t_3$, $t_4$ in FIG. 4. The emitter of transistor 163 is connected to the bus 17, its collector is connected to the supply terminal 29 of the logic circuit 22, forming a control input thereto. The circuit is closed through the transfer switching connection effected by the logic circuit 22. If transistor 163 is conductive, it acts as a controlled current source with high internal resistance, and permits a base current to flow to the transistor which is commanded to be conductive by the logic circuit 22, but only after the changeover, or commutating instant, that is, after time $t_2$ in FIG. 2, namely at time $t_3$. The pulse which renders the transistor conductive terminates before the next commutating instant, that is, at time $t_4$, and before the time $t_5$, where times $t_2$, $t_5$ correspond to a half revolution — electrical — of the rotor, or 180°-el.

Figure 4:
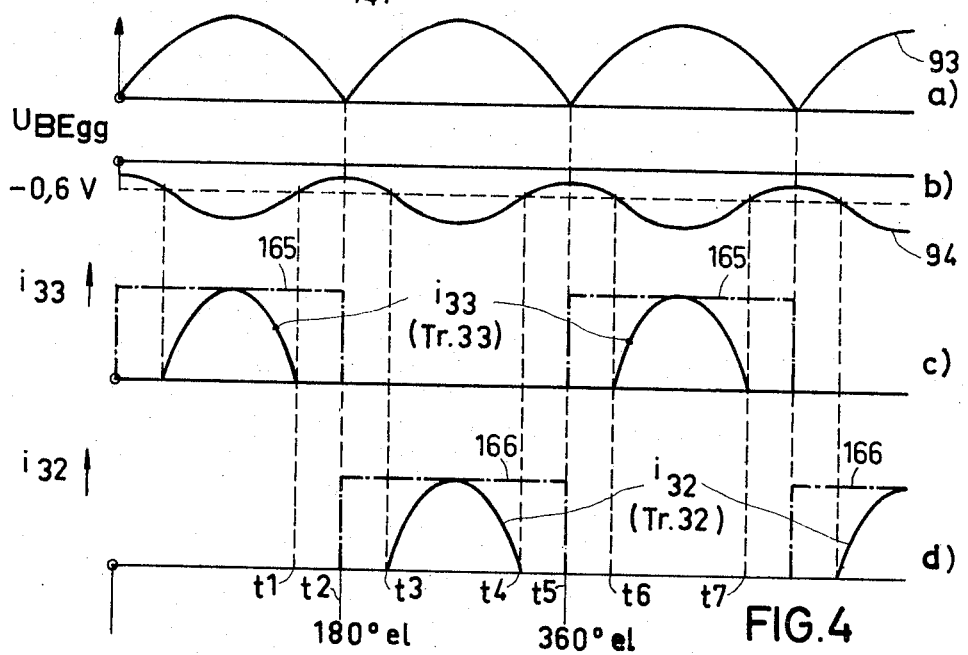
FIG. 4, in graphs a to d, illustrates voltage and current curves arising in the motor and control system of FIG. 2, with respect to time, and useful in connection with the explanation of the operation of the present invention.

FIG. 4, graph (c), shows that the current, due to the change in the magnetic field, should switch or commutate from transistor 33 to transistor 32 at time $t_2$. The current pulses are shown in the graph as $i33$, $i32$, respectively. At time $t_2$, transistor 33 is already blocked, since current $i33$ has ceased flowing at time $t_1$ — compare graphs (c) and (d) in FIG. 4. Transistor 32, however, is not yet conductive, since transitor 133 does not yet supply base current thereto. This base current, as seen in graph (d) of FIG. 4 starts only at time $t_3$ and terminates at time $t_4$, that is, in advance of the commutating instant $t_5$. If the speed becomes too high, the current pulses $i32$, $i33$ become shorter and of lesser amplitude. If the speed becomes too great, the pulses become longer and more intense. Speed can, therefore, be commanded to a value determined by the position of the tap point of potentiometer 154.

Upon starting, transistor 163 is continuously conductive, and the commutation of current from one winding to the other is controlled solely by the magnetic diode pair 18'. Let it be assumed that the current rises rapidly, current curves 165, 166 will then arise for the transistors 33, 32, respectively, as shown, in schematic idealized form in chain-dotted lines in FIG. 4, graphs (c) and (d).

The control circuit of FIG. 2, basically, derives a wavy d-c voltage 93 (graph a), from which an a-c voltage 94 is derived, the minima of which coincide at least approximately with the optimum turn-on periods of the respective motor windings. Thus, the motor will run quietly and with good efficiency. The minima of the voltage 94 are so phase-controlled, and so positioned, that they fall symmetrically between the commutating time instant, that is, between times $t_2$ and $t_5$, FIG. 4.

Other arrangements can be used to obtain the correct phase position of the wavy voltage 94, graph (b) of FIG. 4, such as inversion, for example, which also corresponds, practically, to a phase shift of 180°, provided the inverted voltage is approximately sinusoidal. Reference is made, in this connection, to cross-referenced application Ser. No. 408,781, assigned to the assignee of the present invention.

Decreasing current flow at the supply terminal 29, during commutation of current from transistor 32 to transistor 33 is particularly desirable in motors in which the coils or windings form part of a single phase. In multi-phase arrangements, the decrease of the control current, that is, the waviness of the control current upon switching can be obtained inherently due to the mutual interaction of the output transistors. Arrangements of this type when applied to multi-phase systems may become complicated and while they would improve the gradual switching and generation of pulses, the effect obtained by the arrangement, as described, would be inherently present.

Various changes and modifications may be made within the scope of the inventive concept.

The present invention may be used not only with magnetic field dependent transducers 12, 13, but also with other transducer elements which are responsive to selected conditions or parameters, such as optically responsive elements commanded by light sources which illuminate, or block illumination to the one, or the other transducer element. The diodes 12, 13 in such case would then be light-responsive diodes, for example, rendered conductive or non-conductive dependent upon incident light applied thereto. These diodes can, further, be connected in circuit with suitable resistance elements, all of which are connected across buses 15, 17, to provide varying voltages at a common output junction, similar to junction 14.

The differential response of the diodes 12, 13 is indicated, schematically, in FIG. 1 by the small vertical line, adjacent the diodes 12, 13, one on the left side and the other on the right side with respect thereto.

If the transducer elements are, for example, light-sensitive, one element may be opaque on one side and transparent on the other, with the other element being opaque on the other side and transparent on the first; or the two elements can be separated from each other, located at different sensing positions, to be, respectively, illuminated or not.

I claim:

1. Magnetic field dependent transducer system for connection to supply terminals 15, 17 adapted to have a voltage appear thereacross, comprising two serially connected transducer elements 12, 13 responsive to a magnetic field and changing their respective electrical impedances in opposite directions in response to a unidirectional change in the magnetic field incident thereon, connected to said supply terminals, the voltage appearing at the common junction 14 of said serially connected elements being a function of the direction of the magnetic field acting on said elements;

and a logic circuit 22 having two relatively opposite, complementary, essentially symmetrical outputs 23, 24 and having a supply terminal 29 connecting signals applied to said supply terminal, selectively, with one or the other of said outputs;

the voltage of said junction 14 of the serially connected transducer elements being connected to the logic circuit 22 to control which one of said outputs 23 or 24 will be connected to said supply terminal 29.

2. System according to claim 1, wherein the logic circuit 22 is a non-symmetrical circuit and comprises a first semiconductor element 36 connected between the supply terminal 29 and one output 23;

a second semiconductor element 37 connected between the supply terminal 29 and the other output 24;

conduction of one of said semiconductor elements 36 being controllable, said one semiconductor element having, when in conductive condition, a lower forward voltage drop than the other, the voltage of said common junction 14 being connected to the controllable semiconductor elements to render said one semiconductor element either conductive, or non-conductive;

and circuit means 32, 34; 33, 30 connected to the output terminals 23, 24 selectively inhibiting current flow to that selected output terminal which has the semiconductor element connected thereto having a higher forward voltage drop.

3. System according to claim 1, wherein the logic circuit 22 comprises a voltage controlled semiconductor element 36 connected to and controlled by the voltage appearing at said junction 14, said semiconductor element being connected in the circuit with said supply terminal 29 and controlling one of said outputs 23.

4. System according to claim 3, wherein the other output 24 of said logic circuit 22 is connected to said supply terminal 29 without interposition of a voltage controllable semiconductor element.

5. System according to claim 3, wherein a diode 37 is connected between the other output 24 of said logic circuit 22 and the supply terminal 29, the voltage controlled semiconductor element is a transistor, and the forward voltage drop of the diode is greater than the emitter-collector drop of the transistor when in conductive condition.

6. System according to claim 3, further comprising two controlled semiconductor elements 32, 33, one each being connected to an output terminal 23, 24 of the logic circuit 22;

wherein said logic circuit is a non-symmetrical circuit and comprises a semiconductor element 37 having a fixed forward voltage drop connected between the supply terminal 29 and the other output 24, the total forward voltage drop of said semiconductor element 37 and the voltage drop of the control path of the controlled semiconductor element 33 connected to the other output being greater than the total forward voltage drop of said voltage controlled semiconductor element 36, when in conductive condition, and the voltage drop of the control path of the controlled semiconductor element 32 connected to said one output 23.

7. System according to claim 6, wherein the semiconductor element 37, the controlled semiconductor elements 32, 33, and the voltage controlled semiconductor element 36 comprise an integrated circuit.

8. System according to claim 3, comprising a voltage breakdown element 35 having Zener diode characteristics, connected in series with the junction 14 of the transducer elements 12, 13 and the voltage controlled semiconductor element 36.

9. System according to claim 1, wherein the transducer elements comprise magnetic field sensitive diodes 12, 13.

10. System according to claim 1, in combination with a brushless d-c motor 140 having armature windings 142, 143, an output transistor 32, 33, each, in series with a winding, and controlling current flow therethrough;

the transistors being connected to respective outputs of the logic circuit, so that conduction of one or the other transistor 32, 33 will be controlled from the logic circuit, the extent of conduction being determined by the output signal from said logic circuit, as determined by the signal applied to said supply terminal 29 of the logic circuit 22.

11. System according to claim 10, further comprising means connecting a signal representative of commanded motor operating characteristics to said supply terminal 29.

12. System according to claim 10, further comprising means 151, 152; 156, 163 sensing the instant of commutation of conduction from one transistor to the other, said means being connected to and controlling the voltage applied to said supply terminal 29 to control the conduction of one or the other of the transistors to decrease current flow therethrough immediately prior to, or during commutation.

13. System according to claim 12, wherein said sensing means comprises means 151, 152 sensing induced voltage in the armature coils of the motor;

phase shift means 154–160 phase-shifting said sensed voltage by about 180°, and means 163 controlling the voltage applied to said supply terminal 29 under command of said phase-shifted, sensed voltage.

14. System according to claim 10, wherein the motor has a permanent magnet rotor and wherein said serially connected transducer elements comprise magnetic diodes 12, 13 which are magnetically, relatively oppositely located and arranged on the stator of the motor to be subjected to the field of the rotor of the motor.

15. System according to claim 14, wherein the logic circuit 22 comprises a voltage controlled semiconductor element 36 connected to and controlled by the voltage appearing at said junction 14, said semiconductor element being connected in the circuit with said supply terminal 29 and controlling one of said outputs 23.

16. System according to claim 15, wherein the other output 24 of said logic circuit 22 is connected to said supply terminal 29 without interposition of a voltage controllable semiconductor element.

17. System according to claim 16, wherein said logic circuit is a non-symmetrical circuit and comprises a semiconductor element 37 having a fixed forward voltage drop connected between the supply terminal 29 and the other output 24 of the logic circuit, the total forward voltage drop of said semiconductor element 37 and the voltage drop of the control path of the transistor 33 connected to the other output 24 being greater than the total forward voltage drop of said voltage controlled semiconductor element 36, when in conductive condition, and the voltage drop of the control path of the transistor 32 which is connected to said one output 23 of the logic circuit.

18. System according to claim 15, comprising a voltage breakdown element 35 having Zener diode characteristics, connected in series with the junction 14 of the transducer elements 12, 13 and the voltage controlled semiconductor element 36.

19. System according to claim 14, including means 154, 155, 156 coupled 151, 152 to at least one of the armature windings 142, 143 of the motor, and deriving an undulating d-c voltage from said windings, the frequency of undulation 93 being representative of motor speed;

means deriving an undulating a-c component of said d-c voltage and means connected to and controlling the voltage applied to the supply terminals 29 of the logic circuit controlled by said undulating a-c component 94.

20. System according to claim 19, wherein said undulating a-c component deriving means senses the minimum point at the undulating voltage, and includes phase-shift means 153–155, 157', 160 to place the occurrence of said minimum approximately symmetrically between the commutating instants (FIG. 4, $t_2$, $t_5$).

21. Condition responsive transducer system for connection to voltage supply terminals adapted to have a voltage appear thereacross 15, 17 providing a controlled output depending on a control signal, at a selected output terminal 23, 24 as a function of a predetermined external condition to which said system is responsive, comprising two serially connected transducer elements 12, 13 responsive to a physical condition, or parameter, and each changing its electrical impedance in a first direction in response to a change in the condition, in a predetermined direction, to which the element is responsive, said serially connected elements being connected to the supply terminals;

means 14 deriving a voltage appearing at the common junction connection of said serially connected elements, said voltage being a function of response of at least one, or the other of said elements to occurrence of said condition;

and a logic circuit 22 having two relatively opposite, complementary, essentially symmetrical outputs 23, 24, said logic circuit having a supply terminal 29 connecting said control signal applied to said supply terminal, selectively, with one or the other of said outputs 23, 24;

the voltage derived by said voltage deriving means at said junction being connected to the logic circuit 22 to control which one of said outputs 23 or 24 will be connected to said supply terminal 29.

22. System according to claim 21, wherein the logic circuit 22 is a non-symmetrical circuit and comprises a first semiconductor element 36 connected between the supply terminal 29 and one output 23;

a second semiconductor element 37 connected between the supply terminal 29 and the other output 24;

conduction of one of said semiconductor elements 36 being controllable, said one semiconductor element having, when in conductive condition, a lower forward voltage drop than the other, the voltage of said common junction 14 being connected to the controllable semiconductor elements to render said one semiconductor element either conductive, or non-conductive;

and circuit means 32, 34; 33, 30 connected to the output terminals 23, 24 selectively inhibiting current flow to that selected output terminal which has the semiconductor element connected thereto having a highere forward voltage drop.

23. System according to claim 21, wherein the logic circuit 22 comprises a voltage controlled semiconductor element 36 connected to and controlled by the voltage appearing at said junction 14, said semiconductor element being connected in the circuit with said supply terminal 29 and controlling one of said outputs 23;

two controlled semiconductor elements 32, 33, one each being connected to an output terminal 23, 24 of the logic circuit 22;

wherein said logic circuit is a non-symmetrical circuit and comprises a semiconductor element 37 having a fixed forward voltage drop connected between the supply terminal 29 and the other output 24, the total forward voltage drop of said semiconductor element 37 and the voltage drop of the control path of the controlled semiconductor element 33 connected to the other output being greater than the total forward voltage drop of said voltage controlled semiconductor element 36, when in conductive condition, and the voltage drop of the control path of the controlled semiconductor element 32 connected to said one output 23.

24. System according to claim 21, in combination with a brushless d-c motor 140 having armature windings 142, 143, an output transistor 32, 33, each, in series with a winding, and controlling current flow therethrough;

the transistors being connected to respective outputs of the logic circuit, so that conduction of one or the other transistor 32, 33 will be controlled from the logic circuit, the extent of conduction being determined by the output signal from said logic circuit, as determined by the signal applied to said supply terminal 29 of the logic circuit 22, said control signal being representative of a commanded motor operating condition.

* * * * *

UNITED STATES PATENT OFFICE
CERTIFICATE OF CORRECTION

PATENT NO. : 3,873,898
DATED : March 25, 1975
INVENTOR(S) : Rolf Muller

It is certified that error appears in the above-identified patent and that said Letters Patent are hereby corrected as shown below:

In The Claims:

All reference numerals should have parentheses placed therearound.

Signed and sealed this 10th day of June 1975.

(SEAL)
Attest:

RUTH C. MASON
Attesting Officer

C. MARSHALL DANN
Commissioner of Patents
and Trademarks